United States Patent
Zhang et al.

(10) Patent No.: US 12,096,479 B2
(45) Date of Patent: Sep. 17, 2024

(54) SYSTEM AND METHOD FOR CONFIGURING RANDOM ACCESS PREAMBLES

(71) Applicant: ZTE CORPORATION, Guangdong (CN)

(72) Inventors: Chenchen Zhang, Shenzhen (CN); Wei Cao, Shenzhen (CN); Kaibo Tian, Shenzhen (CN); Zhen Yang, Shenzhen (CN); Nan Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 535 days.

(21) Appl. No.: 17/489,337

(22) Filed: Sep. 29, 2021

(65) Prior Publication Data
US 2022/0022263 A1    Jan. 20, 2022

Related U.S. Application Data

(63) Continuation of application No. PCT/CN2019/081480, filed on Apr. 4, 2019.

(51) Int. Cl.
*H04W 74/0833* (2024.01)
*H04L 27/26* (2006.01)

(52) U.S. Cl.
CPC ..... *H04W 74/0833* (2013.01); *H04L 27/2605* (2013.01)

(58) Field of Classification Search
None
See application file for complete search history.

(56) References Cited

U.S. PATENT DOCUMENTS

| | | |
|---|---|---|
| 11,032,019 B2 * | 6/2021 | Ko ............. H04J 11/00 |
| 2008/0235314 A1 | 9/2008 | Lee et al. |
| 2011/0317780 A1 * | 12/2011 | Kang ......... H04L 5/0053 375/259 |

(Continued)

FOREIGN PATENT DOCUMENTS

| | | |
|---|---|---|
| CN | 109526002 A | 3/2019 |
| WO | WO-2016/011667 A1 | 1/2016 |
| WO | WO-2018/131985 A1 | 7/2018 |

OTHER PUBLICATIONS

International Search Report and Written Opinion of the International Searching Authority on PCT/CN2019/081480 dated Dec. 30, 2019 (8 pages).

(Continued)

*Primary Examiner* — Faiyazkhan Ghafoerkhan
(74) *Attorney, Agent, or Firm* — Foley & Lardner LLP (57) ABSTRACT

A system and method for generating and processing preambles in wireless communication are disclosed herein. In one embodiment, the system and method are configured to receive, from a wireless communication node, a message indicating a first sequence configuration including a set of predefined parameters and a second sequence configuration including a plurality of sets of parameters; generate a first part of a random access preamble based on the set of predefined parameters; generate a second part of the random access preamble based on selecting one of the plurality of sets of parameters; and transmit the random access preamble to the wireless communication node, wherein the first part is configured to be used by the wireless communication node to locate the second part in a time domain.

20 Claims, 8 Drawing Sheets

(56) References Cited

U.S. PATENT DOCUMENTS

| | | | |
|---|---|---|---|
| 2013/0215814 A1* | 8/2013 | Lee | H04W 4/70 370/312 |
| 2013/0242951 A1* | 9/2013 | Lee | H04W 56/0045 370/336 |
| 2015/0117345 A1* | 4/2015 | Kim | H04L 5/005 370/329 |
| 2015/0201445 A1* | 7/2015 | Lee | H04W 4/70 370/336 |
| 2015/0319779 A1 | 11/2015 | Li et al. | |
| 2016/0014718 A1* | 1/2016 | Mysore Balasubramanya | H04W 52/0219 455/458 |
| 2016/0088621 A1* | 3/2016 | Lee | H04W 4/70 370/336 |
| 2016/0142898 A1* | 5/2016 | Poitau | H04W 8/005 370/329 |
| 2016/0330700 A1* | 11/2016 | Lee | H04L 5/0048 |
| 2016/0366658 A1* | 12/2016 | Chae | H04W 56/0015 |
| 2018/0115998 A1* | 4/2018 | Schreiber | H04B 7/0811 |
| 2018/0255521 A1* | 9/2018 | Reial | H04W 74/0833 |
| 2018/0324733 A1* | 11/2018 | Chae | H04L 27/2628 |
| 2019/0191290 A1* | 6/2019 | Poitau | H04W 72/0446 |
| 2019/0297577 A1* | 9/2019 | Lin | H04W 52/0235 |
| 2020/0015177 A1* | 1/2020 | Kim | H04L 27/261 |
| 2020/0099564 A1* | 3/2020 | Axnäs | H04L 27/2655 |
| 2020/0100301 A1* | 3/2020 | Kusashima | H04L 5/0053 |
| 2020/0213963 A1* | 7/2020 | Hakola | H04W 16/28 |
| 2021/0091872 A1* | 3/2021 | Ko | H04J 11/0076 |
| 2021/0235492 A1* | 7/2021 | Iyer | H04W 74/0808 |
| 2022/0022263 A1* | 1/2022 | Zhang | H04L 27/2605 |
| 2022/0263696 A1* | 8/2022 | Shin | H04L 5/0051 |
| 2023/0119731 A1* | 4/2023 | Reial | H04L 27/2613 370/329 |
| 2023/0422312 A1* | 12/2023 | Da Silva | H04W 74/0833 |

OTHER PUBLICATIONS

Extended European Search Report for EP Appl. No. 19923061.6, dated Mar. 25, 2022 (12 pages).

Huawei et al., "Multiple/repeated PRACH preamble formats for NR" 3GPP TSG RAN WG1 Meeting #88bis, R1-1705056, Apr. 2, 2017, Spokane, USA (9 pages).

ZTE, "Multi-user receivers for NOMA" 3GPP TSG RAN WG1 Meeting #93, R1-1805841, May 25, 2018, Busan, Korea (21 pages).

* cited by examiner

SYSTEM AND METHOD FOR CONFIGURING RANDOM ACCESS PREAMBLES

CROSS-REFERENCE TO RELATED APPLICATION

This application claims the benefit of priority under 35 U.S.C. § 120 as a continuation of PCT Patent Application No. PCT/CN2019/081480, filed on Apr. 4, 2019, the disclosure of which is incorporated herein by reference in its entirety.

TECHNICAL FIELD

The disclosure relates generally to wireless communications and, more particularly, to systems and methods for generating and processing preambles in wireless communication.

BACKGROUND

Wireless communications between base stations and user equipment can include a random access procedure during which a user equipment can initiate communication with a base station. During the random access procedure, the user equipment can detect communication information broadcasted by the base station. The user equipment can utilize the communication information to generate messages to initiate and sustain communications with the base station.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

In one embodiment, a method performed by a wireless communication device includes receiving, from a wireless communication node, a message indicating a first sequence configuration including a set of predefined parameters and a second sequence configuration including a plurality of sets of parameters. The method further includes generating a first part of a random access preamble based on the set of predefined parameters. The method also includes generating a second part of the random access preamble based on selecting one of the plurality of sets of parameters. The method additionally includes transmitting the random access preamble to the wireless communication node, wherein the first part is configured to be used by the wireless communication node to locate the second part in a time domain.

In another embodiment, a method performed by a wireless communication node includes transmitting, to a wireless communication device, a message indicating a first sequence configuration including a set of predefined parameters and a second sequence configuration including a plurality of sets of parameters. The method further includes receiving, from the wireless communication device, a random access preamble including a first part and second part. The first part of the random access preamble is generated based on the first sequence configuration and the second part of the random access preamble is generated based on a selection of the sets of parameters in the second sequence configuration. The time-frequency resource used by the second part can be derived from that of the first part.

The above and other aspects and their implementations are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION OF EXAMPLE EMBODIMENTS

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

Figure 1:
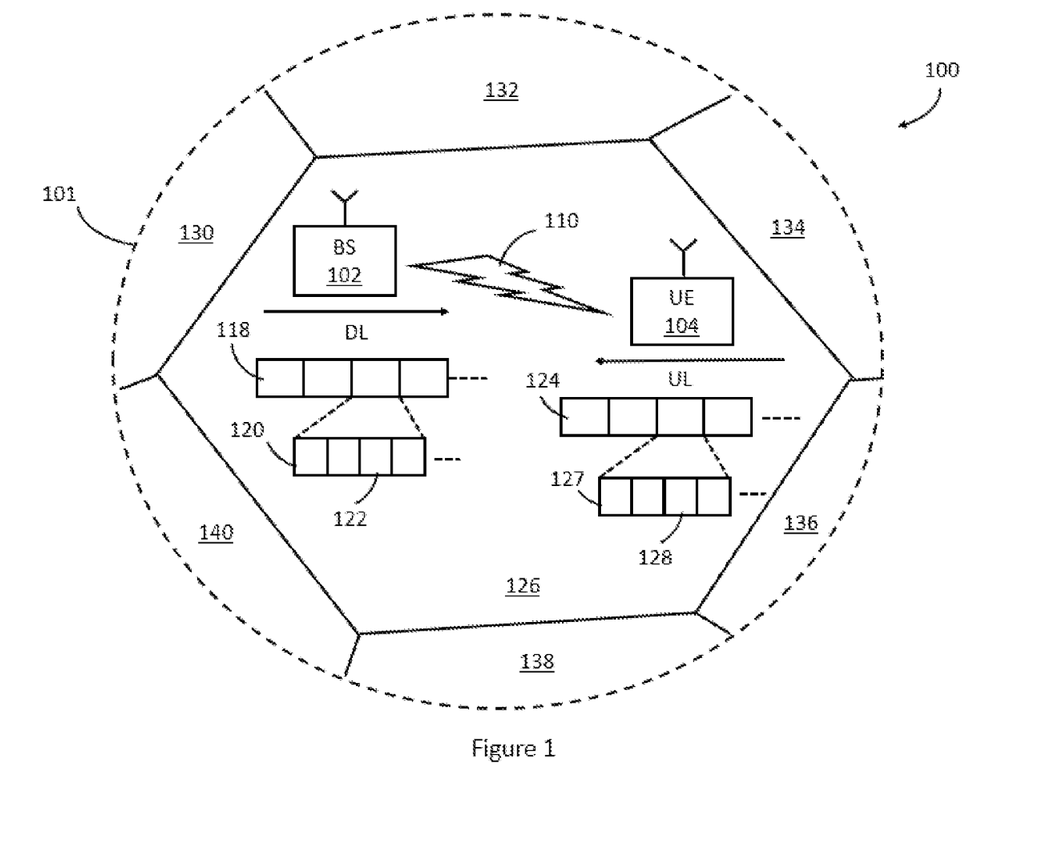
FIG. 1 illustrates an example cellular communication network in which techniques and other aspects disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102") and a user equipment device 104 (hereinafter "UE 104") that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
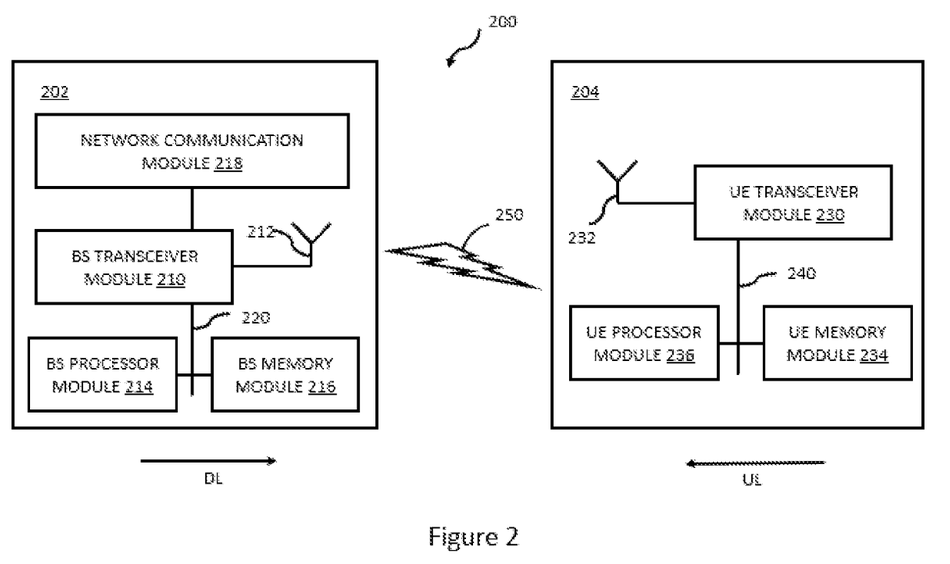
FIG. 2 illustrates block diagrams of an example base station and a user equipment device, in accordance with some embodiments of the present disclosure.

FIG. 2 illustrates a block diagram of an example wireless communication system 200 for transmitting and receiving wireless communication signals, e.g., orthogonal frequency-division multiplexing (OFDM)/orthogonal frequency-division multiple access (OFDMA) signals, in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure.

In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 can be coordinated in time such that the uplink receiver circuitry is coupled to the uplink antenna 232 for reception of transmissions over the wireless transmission link 250 at the same time that the downlink transmitter is coupled to the downlink antenna 212. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

Having discussed aspects of a networking environment as well as devices that can be used to implement the systems, methods and apparatuses described herein, additional details shall follow.

The BS (e.g., a terrestrial radio station, a satellite based radio station, evolved node B (eNB), a serving eNB, a target eNB, a femto station, or a pico station) and the UE (e.g., wireless communication device) can communicate with each other based on a mutually agreed on time domain structure. For example, the time domain communication can include a series frames, where each frame can include subframes. The subframes can include uplink subframes and downlink subframes. During the uplink subframe, information from the UE is transmitted to the BS, while during the downlink subframe, information from the BS is transmitted to the UE. In some examples, the start of uplink subframes of all UEs communicating with the same BS can have particular time constraints. For example, the BS may specify that the uplink information from all the UEs arrive at approximately the same time. As the UEs communicating with the same BS may be located at different distances from the BS, individual UEs may have to adjust the timing of their transmission of uplink information based on their distance, or specifically based on a propagation delay of transmission between the UE and the BS.

The BS can determine the propagation delay of signal transmission between the BS and the UEs. Based on the determined propagation delay, the BS can send "timing advance" commands to the UEs, where the timing advance commands can include information that the UE can utilize to adjust the timing of transmission of their uplink transmission such that the uplink transmissions from all UEs arrive that the BS at approximately the same time. As an example, farther the UE is located from the BS, larger is the timing advance.

The BS can determine the propagation delay associated with a UE based on the random-access procedure. For example, the random-access procedure can be used by the UEs to synchronize with the BS and to initiate data transfer. The random-access procedure can include the UE transmitting a preamble to the BS. The UE can generate the preamble based on, for example, cyclic shifts of complex-valued mathematical sequences, such as, for example, the Zadoff-Chu (ZC) sequence. The UE can transmit the generated preambles to the BS, which can correlate the received preambles with present preambles. The correlation can result in a peak, that can indicate an identity of the UE as well as a time delay or a propagation time of the transmission from the UE.

The determination of the time delay can be difficult when the distance between the BS and the UE is large. For example, the BS can be located on a satellite orbiting the earth while the UE's can be located on the surface of the earth. In some other instances, a cell serviced by a BS can be relatively large. The large distances between the UE and the BS can have large associated time delays. In some such instances, the peak resulting from correlating the preamble received from such a UE can deviate across a whole symbol, which is included in the preamble, making the detection of the peak difficult.

In the following description, a technical solution to the problem of determining time delays of UEs located at large distances from the BS. In particular, a preamble having separate timing and identifying functions is discussed. For example, the preamble can be formed by concatenating a first part and a second part. The first part can be utilized by the BS to determine a time delay of the signal transmitted from the UE. The BS can utilize the second part to identify the UE. Within each cell, in some embodiments, the first parts of respective UEs can be the same. In some embodiments, the first pars of respective UEs must be the same. Further, in some embodiments, second parts of UEs can be unique to the respective UE. In some embodiments, the second parts of UEs must be unique to the respective UE. Furthermore, in some embodiments, the first part of the preamble can be different from the second part of the preamble. In some embodiments, the first part of the preamble must be different from the second part of the preamble. In some examples, both the first part and the second part of the preamble can include one or more OFDM symbols, which can be generated using m-sequences or ZC-sequences.

When the BS receives the preamble, including the first part and the second part, the BS can perform a moving correlation of the received preamble to detect a peak. The detected peak can indicate the timing delay. Further, the BS can process the symbol in the second part to determine, for example, a cyclic shift of the symbol in relation to a root symbol. The cyclic shift can provide an identity of the transmitting UE.

Utilizing the two-part preamble described above, and discussed in further detail below, can provide several advantages. For example, the preamble can by successfully used in determining large time delays of transmitting UEs. In addition, the UEs may need to generate and transmit short preambles to initiate access to the BS and can result in reduced resources. Further, as the first part of the preamble is used to determine the time delay, the second part can be short and have compact cyclic shifts, resulting in reduced data and faster processing at the BS. Furthermore, the BS can utilize the first part of the preamble to additionally determine a frequency of transmission of the signal. The BS can utilize this information to reduce or eliminate frequency offset in the second part of the preamble.

Some example implementations utilize concatenated preambles to generate long preambles to allow for detection of large time delays. However, such approaches can result in undesirably long preambles and can result in increase in the complexity of processing at the BS. Moreover, with such long preambles, the root, of a ZC-sequence for example, may be able to support only a few different preambles, increasing the risk of collision. In contrast, the preamble discussed herein can allow initialization of access to the BS with only two symbols, and the root can support a large number of unique preambles, thereby reducing collision.

A UE, such as for example the UE 104 shown in FIG. 1, can carry out cell search for the cell 126 when the UE 104 first enters the cell 126 or when the UE 104 is moving within the cell 126. The BS, to enable UEs to find the respective cell, can repeatedly transmit synchronization signals, which the UE can receive and process to be able to communicate with the BS. As an example, the synchronization signals can include two synchronization signals: a primary synchronization signal (PSS) and a secondary synchronization signal (SSS). The BS can transmit the PSS and the BSS during a downlink subframe period associated with the BS. In addition to the PSS and the SSS, the BS can transmit a physical broadcast channel (PBCH). The PSS and SSS, together with the PBCH can be jointly referred to as a synchronization signal (SS) block.

The BS can transmit the SS block on a set of OFDM symbols. As an example, the PSS can be transmitted in the first OFDM of the SS block, and can occupy 127 subcarriers in the frequency domain. The SSS can be transmitted in the third OFDM symbol of the SS block and can occupy the same set of subcarriers as the PSS. The PBCH can be transmitted within the second and fourth OFDM symbols of the SS block, and can utilize 48 subcarriers on each side of the SSS. The PSS can include a sequence of elements (which is one example of "a first sequence") that can be mapped onto the subcarriers that the PSS occupies. For example, the PSS can include an m-sequence having 127 elements mapped onto the 127 subcarriers. In some examples, the PSS can include a predefined polynomial and a predefined initial seed of the m-sequence. The predefined polynomial and the predefined initial seed can be one example of "a set of predefined parameters". The SSS can also include a sequence of elements that are derived from m-sequences and are mapped onto the subcarriers that the SSS occupies. The PBCH can include information that the UE may need to acquire the system information broadcast by the BS. In some instances, the PBCH can include an SS-block timing index, subcarrier spacing, subcarrier numerology, SS block time index, CRB (common resource block), etc. In some examples, the BS can transmit a first sequence configuration including a set of predefined parameters. The set of predefined parameters include a predefined polynomial and a predefined initial seed that can be used to generate an m-sequence. The set of predefined parameters can include a predefined sequence root and a predefined cyclic shift that can be used to generate a ZC-sequence.

Physical Random-Access Channel (PRACH) Preamble Structure

Figure 3:
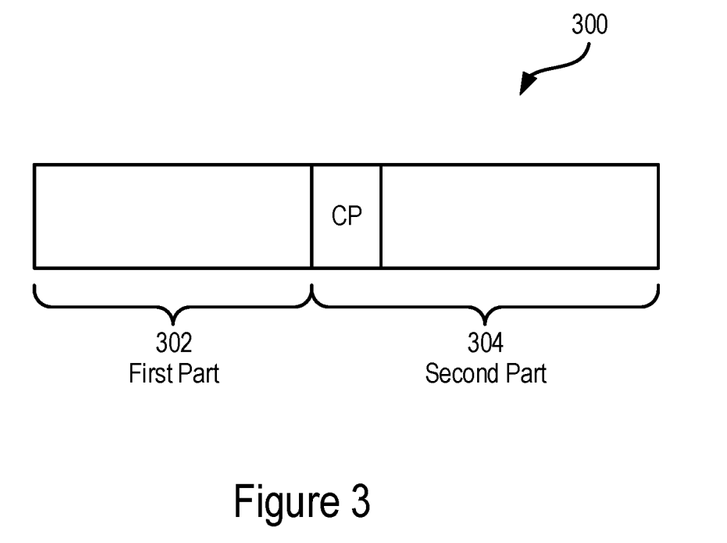
FIG. 3 illustrates an example preamble, in accordance with some embodiments of the present disclosure.

As mentioned above, the BS and UE can carry out a random-access procedure to establish communication. The UE can transmit a preamble that can be detected by the BS. FIG. 3 illustrates an example preamble 300. In particular, the example preamble 300 can include a first part 302 and a second part 304. The first part and the second parts can include a ZC-sequence or a m-sequence. The first part can be adjacent to the second part in the time domain. In each cell (such as, for example, the cell 126 shown in FIG. 1), the first part of all preambles of the UEs is the same. That is, all UEs in the same cell generate the same first part of the preamble. But the second parts of any two preambles are different. That is, the UE generates a second part that is different from the second part generated by any other UE in the cell. Each of the first part and the second part of the preamble can be formed using one or more OFDM symbols. In addition, the second part can include a cyclic prefix.

Figure 4:
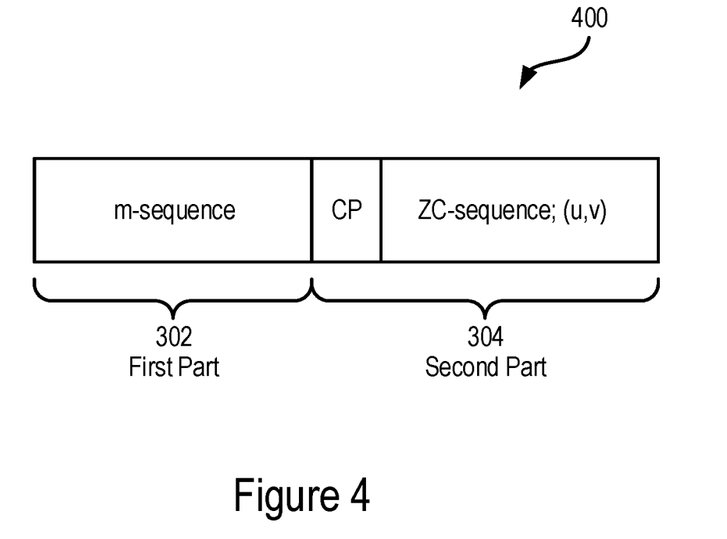
FIG. 4 illustrates a first example preamble including m-sequence and Zadoff-Chu (ZC)-sequence in the first part and the second part, respectively, in accordance with some embodiments of the present disclosure.

FIG. 4 illustrates a first example preamble 400 including m-sequence and ZC-sequence in the first part and the second part, respectively. In particular, the m-sequence can be generated based on a predefined polynomial and a predefined initial seed, and the ZC-sequence can be generated based a sequence root "u" and a cyclic shift "v", both of which can be selected by individual UEs. The predefined polynomial and the predefined initial seed can be received from the BS, while the sequence root "u" and the cyclic shift "v" can be a selected set of parameters that the UE can select from a pool in a manner similar to RACH in New Radio (NR).

Figure 5:
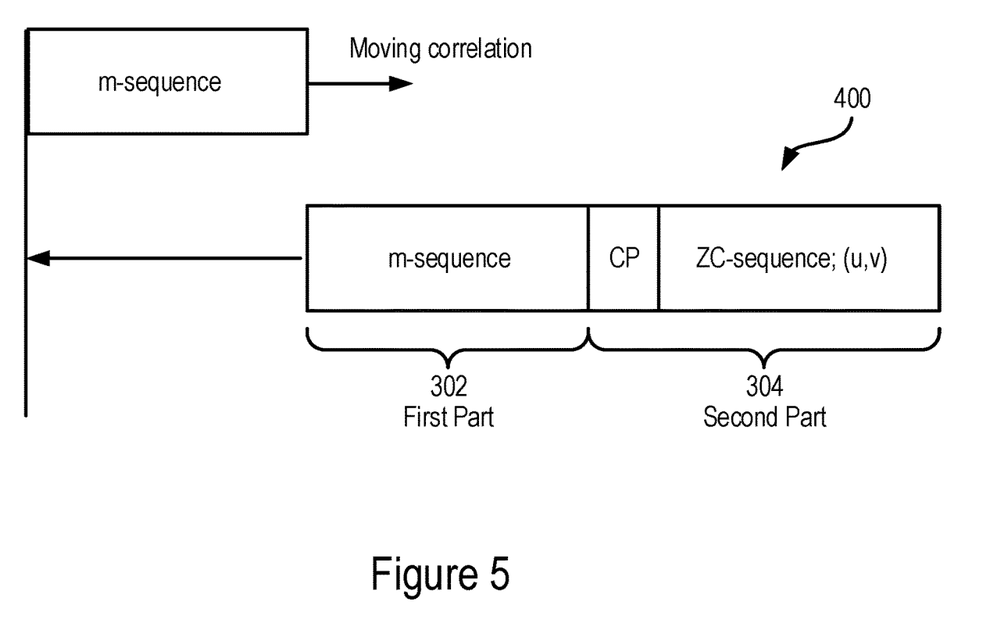
FIG. 5 illustrates a representation of the processing of the preamble received at a base station (BS), in accordance with some embodiments of the present disclosure.

FIG. 5 illustrates a representation of the processing of the preamble received at the BS. When the preamble is received by the BS, the BS can carry out a moving correlation of first part of the first example preamble 400. For example, the m-sequence of the first part can be correlated with the m-sequence, the parameters of which were previously transmitted by the BS, to detect a peak, which can indicate a time offset (also referred to as a "time delay") of the random access preamble and a frequency offset of the random access preamble. Similarly, the BS can perform a correlation of the ZC-sequence in the second part with the ZC-sequence at the BS to determine the sequence root "u" and the cyclic shift "v" of the ZC-sequence.

Table 1 below shows example values that can be utilized for the first example preamble 400 shown in FIG. 4. These values are only examples, and that different implementations can include different values.

TABLE 1

| Parameter | Value |
| --- | --- |
| First Part | An OFDM symbol including the m-sequence in the PSS shifted by 10 |
| Second part | An OFDM symbol including a ZC-sequence (u, v) |
| SCS (subcarrier spacing) | 1.25 kHz |
| CP (cyclic prefix) length | 1808 Ts |
| Cyclic Shifts (v) | {0, 11, 22, . . . , 825} |

The first example preamble can include a first part having an OFDM symbol including the m-sequence received in the PSS from the BS shifted by 10 (based on, e.g., a predefined polynomial and a predefined initial seed). The second part can be formed using a NR format with numerology=0. That is radio frame can include 10 subframes of 1 ms each and have a subcarrier spacing equal to 1.25 kHz. With the assumption that the largest multipath delay is about $10^{-5}$ seconds, the cyclic prefix length (CP length) can be set at 1808 Ts. The "Ts," as used herein, may be referred to as a sampling time with a value of $1/(15000 \times 2048)$ seconds. For the second part, a ZC-sequence generated based on a selected sequence root and a value "v" of a cyclic shift that can be selected from the set {0, 11, 22, . . . , 825} to result in a 839-length ZC-sequence. In some instances, where the multipath delay is shorter than $10^{-5}$, the cyclic shifts can have increased density. The BS after the m-sequence of the first part is detected, the ZC-sequence of the second part can be detected based on the interval 1808 Ts-(1808+24576)Ts.

Table 2 below shows example values that can be utilized for the first example preamble 400 shown in FIG. 4. These values are only examples, and that different implementations can include different values.

TABLE 2

| Parameter | Value |
| --- | --- |
| First Part | An OFDM symbol including the m-sequence in the PSS shifted by 10 |
| Second part | An OFDM symbol including a ZC-sequence (u, v) repeated four times |
| SCS (subcarrier spacing) | 5 kHz |
| CP (cyclic prefix) length | 1808 Ts |
| Cyclic Shifts (v) | {0, 41, 82, . . . , 779} assuming $10^{-5}$ multipath delay |

The example values shown in Table 2 include the second part having a NR format 3, which indicates a subcarrier spacing of 5 kHz. The first part includes an OFDM symbol including first sequence generated by shifting the PSS received by the BS by 10. The second part includes an OFDM symbol including the ZC-sequence based on a selected sequence root and a cyclic shift "v" selected from {0, 41, 82, . . . , 779} with assumption that the multipath delay is equal to $10^{-5}$ seconds.

Figure 6:
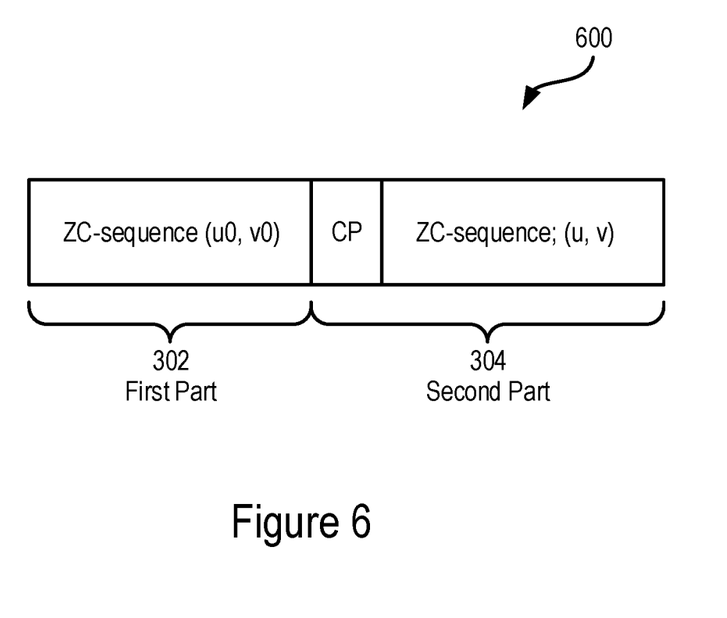
FIG. 6 illustrates a second example preamble including a first ZC-sequence and a second ZC-sequence in the first part and the second part, respectively, in accordance with some embodiments of the present disclosure.

FIG. 6 illustrates a second example preamble 600 including a first ZC-sequence and a second ZC-sequence in the first part and the second part, respectively. The value of "u0" of the ZC-sequence in the first part is different from the value of "u" of the ZC-sequence in the second part of the preamble. That is, the sequence root of the first ZC-sequence in the first part is different from the sequence root of the ZC-sequence in the second part of the preamble. The first ZC-sequence can be based on a predefined sequence root and a predefined cyclic shift received from the BS. The second ZC-sequence can be based on a sequence root and cyclic shift selected by UE. The BS, upon receiving the second example preamble 500, can process the first part by using the process discussed above in relation to FIG. 5. That is, the BS can perform a moving correlation with the first ZC-sequence to determine the time delay and the frequency offset, and utilize that information to detect the offset and the identity of the UE from the second ZC-sequence.

Figure 7:
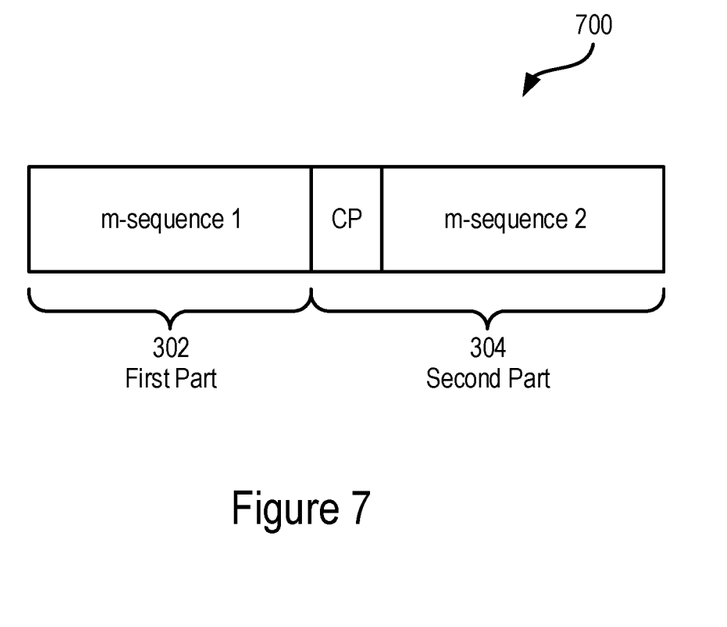
FIG. 7 illustrates a third example preamble including a first m-sequence and a second m-sequence in the first part and the second part, respectively, in accordance with some embodiments of the present disclosure.

FIG. 7 illustrates a third example preamble 700 including a first m-sequence and a second m-sequence in the first part and the second part, respectively, of the preamble. The first m-sequence and the second m-sequence are different form each other. The first m-sequence can be based on a predefined polynomial and a predefined initial seed received from the BS. The second m-sequence can be based on a polynomial and an initial seed that are selected by UE. The BS can perform a moving correlation of the first m-sequence to determine the time delay and the frequency offset, and utilize that information to determine the offset and the identity of the UE from the second m-sequence.

Figure 8:
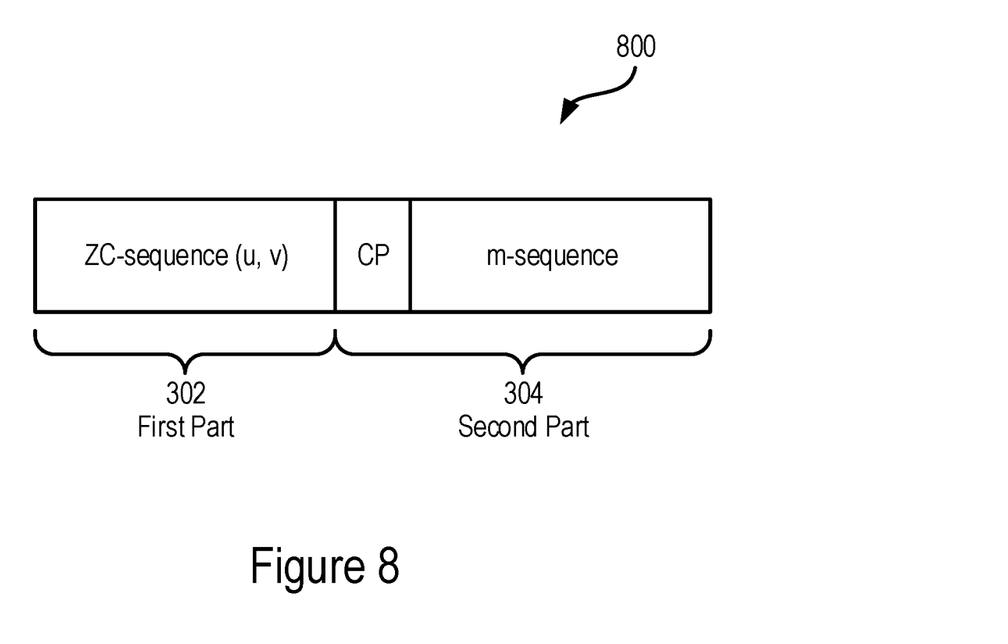
FIG. 8 illustrates a fourth example preamble including a ZC-sequence and a m-sequence in the first part and the second part, respectively, in accordance with some embodiments of the present disclosure.

FIG. 8 illustrates a fourth example preamble 800 including a ZC-sequence and a m-sequence in the first part and the second part, respectively, of the preamble. The ZC-sequence can be based on a predefined sequence root and a predefined cyclic shift received from the BS. The m-sequence in the second part can be based on a selected polynomial and a selected initial seed. The BS can perform a moving correlation with the ZC-sequence to determine the time delay and the frequency offset, and utilize that information to detect the offset and the identity of the UE from the m-sequence.

Figure 9:
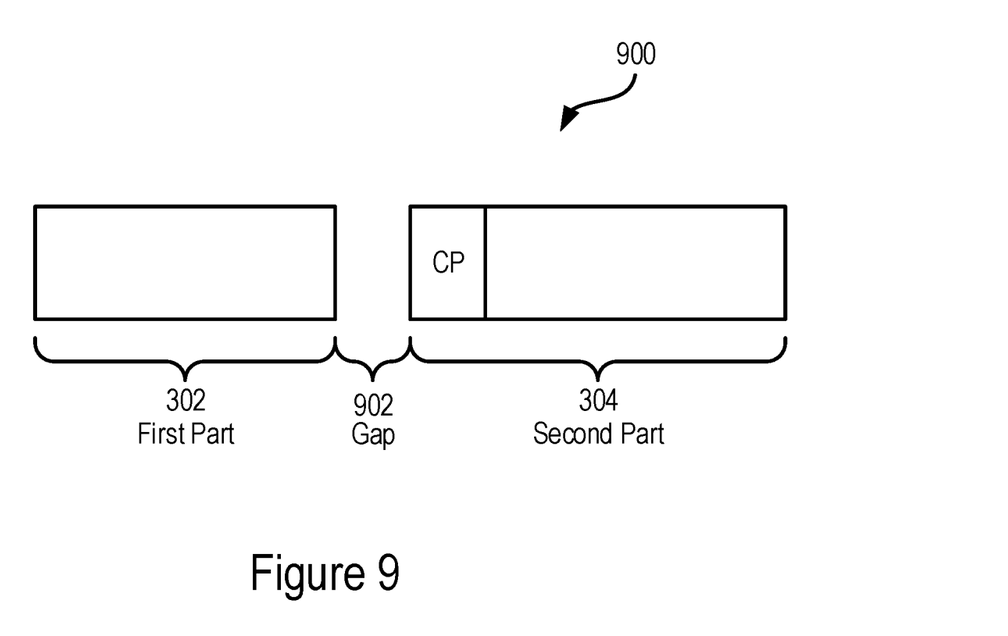
FIG. 9 illustrates a fifth example preamble including a gap in the time domain between the first part and the second part of the preamble, in accordance with some embodiments of the present disclosure.

FIG. 9 illustrates a fifth example preamble 900 including a gap 902 in the time domain between the first part and the second part of the preamble. The first part and the second part of the fifth example preamble 900 can have a gap therebetween. The gap can include some data bits or symbols or can be left blank. The position of the second part can be determined from the first part. In some such instances, the second part can also precede the first part in the time domain, as long as the positions of the first and the second part can be determined.

Long Time Delay Estimation

In some instances, the preambles discussed herein can be utilized for estimating a long time delay. For example, if the time delay is larger than the interval between two random-access channel (RACH) occasions, the preamble discussed herein can be configured to estimate the long time delay. For instance, assuming that the time delay is 16 ms, and the interval between two RACH occasions (e.g., the RACH resource period after which RACH slots including RACH occasions are repeated) is 1 ms, the RACH occasions can be circularly indexed from 1 to 16. The UE can generate 16 m-sequences for the first part, and transmit the i-th m-sequence as its first part for the i-th RACH occasion. The BS can utilize the indexed first parts to determine the long time delay.

Figure 10:
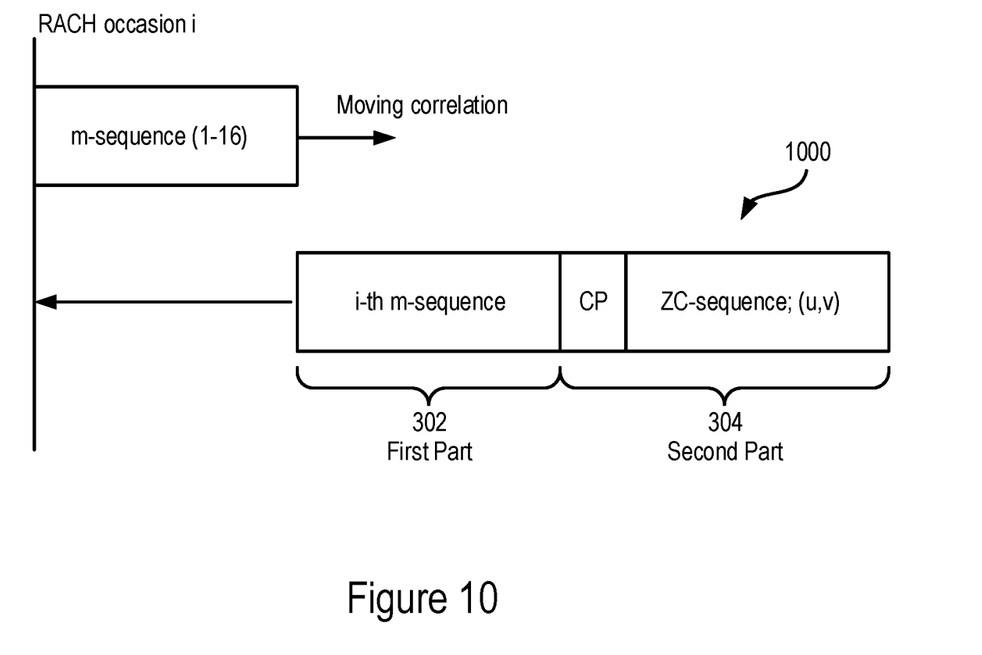
FIG. 10 illustrates a representation of the processing of a first indexed preamble received at the BS, in accordance with some embodiments of the present disclosure.

FIG. 10 illustrates a representation of the processing of a first indexed preamble 1000 received at the BS. In particular, the BS can perform a moving correlation of each of 16 m-sequences with the received i-th m-sequence in the i-th preamble corresponding to the i-th RACH occasion. The time delay determined based on the moving correlation and the index can indicate the long time delay. While the first part of the first indexed preamble shown in FIG. 10 is an m-sequence, it is understood that the first part may alternatively include a different sequence, such as, for example, in indexed ZC-sequence.

The UE can receive the message from the BS indicating the "i" RACH occasions, which correspond to predefined sequence configurations. For example, the 16 RACH occasions can correspond to 16 predefined sequence configurations, which, for each occasion in case of m-sequences, can include a predefined polynomial and a predefined initial seed. In the example illustrated in FIG. 10, the UE can determine one of the "i" RACH occasions, and generate the m-sequence based on the predefined sequence configurations associated with the i-th RACH occasion. The UE can attach one or more symbols, such as, for example, OFDM symbols, to the random access preamble for the i-th RACH. The attached symbol can be representative of the m-sequence generated based on the predefined sequence configurations associated with the i-th RACH.

Figure 11:
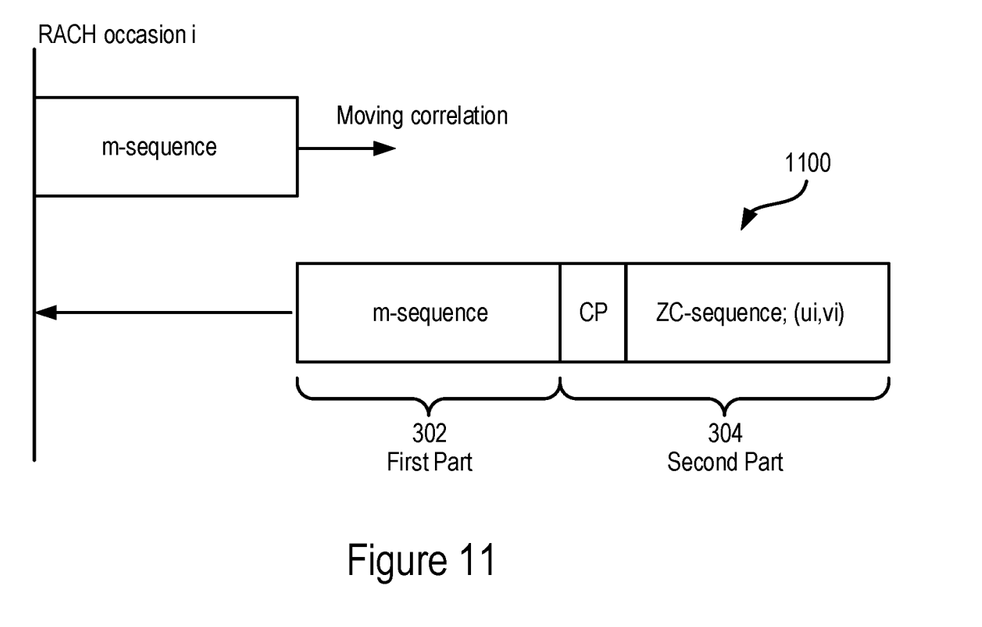
FIG. 11 illustrates another representation of the processing of a second indexed preamble received at the BS, in accordance with some embodiments of the present disclosure.

In some instances, the second part of the preamble can be indexed instead of the first part. FIG. 11 illustrates another representation of the processing of a second indexed preamble 1100 received at the BS. In particular, unlike the first indexed preamble 1000 shown in FIG. 10, where the first part of the preamble was indexed, in the second indexed preamble 1100 shown in FIG. 11, the second part of the preamble is indexed. As an example, the second part of the second indexed preamble is an indexed ZC-sequence (ui, vi), where the index "i" associated with "u" and "v" corresponds to the selected sequence root and the selected cyclic shift associated with the i-th RACH occasion. The first part can include an m-sequence, as shown in FIG. 11, or can include another ZC-sequence that is not indexed. The BS can perform the moving correlation of a single m-sequence, instead of 16 m-sequences as shown in FIG. 10, to determine the time delay and frequency offset of from the resulting peak. The index of the ZC-sequence can be used to determine the overall time delay.

The UE can receive the message from the BS indicating the "i" RACH occasions. The UE can associate each of the plurality of sets of parameters, such as, for example, the sequence root and the cyclic shift for a ZC-sequence, with the respective one of the i-th RACH occasion. The UE can generate the ZC-sequence for the second part of the preamble associated with the i-th RACH occasion based on the i-th root ("ui") and cyclic shift ("vi"). The UE can then transmit the preamble for the i-th RACH with the second part including the generated ZC-sequence.

Figure 12:
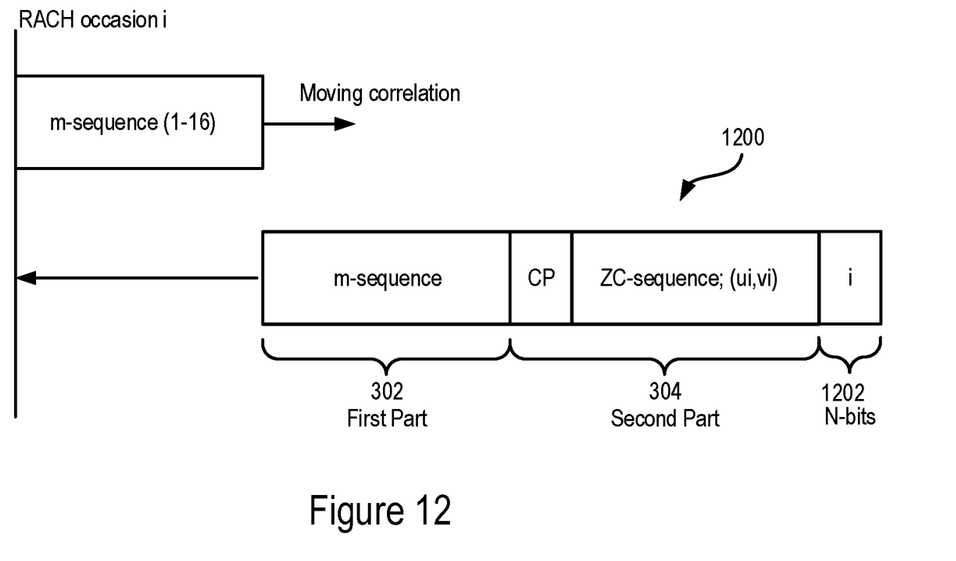
FIG. 12 illustrates another representation of the processing of a third example preamble received at the BS, in accordance with some embodiments of the present disclosure.

FIG. 12 illustrates another representation of the processing of a third example preamble 1200 received at the BS. In particular, the third indexed preamble 1200 can include a RACH occasion index 1202 separate from the first part and the second part of the preamble. An RACH occasion index 1202 can include N-bits that represent the value of the i-th RACH occasion associated with the preamble. As an example, the RACH occasion index 1202 can include four bits to represent 16 RACH occasions. In such instances, the BS can process the preamble in a manner similar to that discussed above in relation to FIG. 4. However, the BS can determine the long time delay based also on the value of the RACH occasion index 1202.

The UE can receive the message from the BS indicating the "i" RACH occasions. The UE can select an i-th occasion for transmission. Based on the selected i-th occasion, the UE can attach one or more symbols, such as the occasion index 1202, indicating the index of the i-th RACH occasion associated with the selected i-th RACH occasion for transmission.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method for wireless communication, comprising:
receiving, from a wireless communication node, a message indicating a first sequence configuration including a set of predefined parameters and a second sequence configuration including a plurality of sets of parameters;
generating a first part of a random access preamble based on the set of predefined parameters;
generating a second part of the random access preamble based on selecting one of the plurality of sets of parameters; and
transmitting the random access preamble to the wireless communication node, wherein the first part is configured to be used by the wireless communication node to locate the second part in a time domain.

2. The method of claim 1, further comprising:
generating a cyclic prefix attached to a starting position of the second part of the random access preamble in the time domain.

3. The method of claim 1, wherein the set of predefined parameters includes a predefined polynomial and a predefined initial seed for an m-sequence, and wherein the selected set of parameters includes a selected sequence root and a selected cyclic shift for a Zadoff-Chu sequence.

4. The method of claim 1, wherein the set of predefined parameters includes a predefined sequence root and a predefined cyclic shift for a first Zadoff-Chu sequence, and wherein the selected set of parameters includes a selected sequence root and a selected cyclic shift for a second, different Zadoff-Chu sequence.

5. The method of claim 1, wherein the set of predefined parameters includes a predefined polynomial and a predefined initial seed for a first m sequence and wherein the selected set of parameters includes a selected polynomial and a selected initial seed for a second, different m-sequence.

6. The method of claim 1, wherein the set of predefined parameters includes a predefined sequence root and a predefined cyclic shift for a Zadoff-Chu sequence, and wherein the selected set of parameters includes a selected polynomial and a selected initial seed for an m-sequence.

7. The method of claim 1, further comprising:
receiving the message further indicating a plurality of random access channel occasions, which correspond to a plurality of predefined sequence configurations;
determining one of the plurality of random access channel occasion; and
generating the first part of the random access preamble based on one of the plurality of predefined sequence configurations corresponding to the determined random access channel occasion.

8. The method of claim 1, further comprising:
receiving the message further indicating a plurality of random access channel occasions, which correspond to a plurality of predefined sequence configurations;
determining one of the plurality of random access channel occasion; and
attaching one or more symbols, indicating one of the plurality of predefined sequence configurations corresponding to the determined random access channel occasion, to the random access preamble.

9. The method of claim 1, further comprising:
receiving the message further indicating a plurality of random access channel occasions;
associating each of the plurality of sets of parameters with a respective one of the plurality of random access channel occasions;
determining one of the plurality of random access channel occasion; and
generating the second part of the random access preamble based on one of the plurality of sets of parameters corresponding to the determined random access channel occasion.

10. A method for wireless communication, comprising:
transmitting, to a wireless communication device, a message indicating a first sequence configuration including a set of predefined parameters and a second sequence configuration including a plurality of sets of parameters; and
receiving, from the wireless communication device, a random access preamble including a first part and second part, wherein the first part of the random access preamble is generated based on the set of predefined parameters and the second part of the random access preamble is generated based on a selected one of the plurality of sets of parameters; and
locating the second part of the random access preamble in a time domain based on the first part of the random access preamble.

11. The method of claim 10, wherein the set of predefined parameters includes a predefined polynomial and a predefined initial seed for an M-sequence, and wherein the selected set of parameters includes a selected sequence root and a selected cyclic shift for a Zadoff-Chu sequence.

12. The method of claim 10, wherein the set of predefined parameters includes a predefined sequence root and a predefined cyclic shift for a first Zadoff-Chu sequence, and wherein the selected set of parameters includes a selected sequence root and a selected cyclic shift for a second, different Zadoff-Chu sequence.

13. The method of claim 10, wherein:
the set of predefined parameters includes a predefined polynomial and a predefined initial seed for a first M sequence and wherein the selected set of parameters includes a selected polynomial and a selected initial seed for a second, different M-sequence; or
the set of predefined parameters includes a predefined sequence root and a predefined cyclic shift for a Zadoff-Chu sequence, and wherein the selected set of parameters includes a selected polynomial and a selected initial seed for an M-sequence.

14. The method of claim 10, wherein the random access preamble includes a cyclic prefix attached to a starting position of the second part.

15. A wireless communications apparatus, comprising:
at least one processor configured to:
receive, from a wireless communication node, a message indicating a first sequence configuration including a set of predefined parameters and a second sequence configuration including a plurality of sets of parameters;
generate a first part of a random access preamble based on the set of predefined parameters;
generate a second part of the random access preamble based on selecting one of the plurality of sets of parameters; and
transmit the random access preamble to the wireless communication node, wherein the first part is configured to be used by the wireless communication node to locate the second part in a time domain.

16. The wireless communications apparatus of claim 15, wherein the at least one processor is further configured to:
generate a cyclic prefix attached to a starting position of the second part of the random access preamble in the time domain.

17. The method of claim 15, wherein the set of predefined parameters includes a predefined polynomial and a predefined initial seed for an m-sequence, and wherein the selected set of parameters includes a selected sequence root and a selected cyclic shift for a Zadoff-Chu sequence.

18. The wireless communications apparatus of claim 15, wherein the set of predefined parameters includes a predefined sequence root and a predefined cyclic shift for a first Zadoff-Chu sequence, and wherein the selected set of parameters includes a selected sequence root and a selected cyclic shift for a second, different Zadoff-Chu sequence.

19. The wireless communications apparatus of claim 15, wherein the set of predefined parameters includes a predefined polynomial and a predefined initial seed for a first m sequence and wherein the selected set of parameters includes a selected polynomial and a selected initial seed for a second, different m-sequence.

20. The wireless communications apparatus of claim 15, wherein the set of predefined parameters includes a predefined sequence root and a predefined cyclic shift for a Zadoff-Chu sequence, and wherein the selected set of parameters includes a selected polynomial and a selected initial seed for an m-sequence.

* * * * *